(12) United States Patent
Wiss

(10) Patent No.: US 7,336,732 B1
(45) Date of Patent: Feb. 26, 2008

(54) CARRIER FREQUENCY DETECTION FOR SIGNAL ACQUISITION

(75) Inventor: John Robert Wiss, Carlsbad, CA (US)

(73) Assignee: L-3 Communications Titan Corporation, San Diego, CA (US)

( * ) Notice: Subject to any disclaimer, the term of this patent is extended or adjusted under 35 U.S.C. 154(b) by 681 days.

(21) Appl. No.: 10/900,704

(22) Filed: Jul. 28, 2004

(51) Int. Cl.
    *H04B 3/46* (2006.01)
(52) U.S. Cl. .......... 375/326; 375/324; 375/316; 375/261; 375/339; 375/329; 455/337; 455/23; 455/21; 329/304; 329/306; 329/307
(58) Field of Classification Search .......... 375/324, 375/316, 326, 261, 339, 329; 455/337, 23, 455/21; 329/304, 306, 307
    See application file for complete search history.

(56) References Cited

U.S. PATENT DOCUMENTS

| | | | | |
|---|---|---|---|---|
| 4,599,701 | A * | 7/1986 | Vojir et al. | 708/605 |
| 5,025,455 | A * | 6/1991 | Nguyen | 375/327 |
| 5,671,257 | A * | 9/1997 | Cochran et al. | 375/355 |
| 5,960,044 | A * | 9/1999 | Montreuil | 375/322 |
| 6,002,721 | A * | 12/1999 | Said et al. | 375/261 |
| 6,459,888 | B1 * | 10/2002 | Clark | 455/266 |
| 6,647,066 | B1 * | 11/2003 | Szajnowski | 375/260 |
| 6,993,095 | B2 * | 1/2006 | Heegard et al. | 375/327 |
| 2005/0141594 | A1 * | 6/2005 | Smith et al. | 375/130 |
| 2006/0072656 | A1 * | 4/2006 | Wiss et al. | 375/226 |

OTHER PUBLICATIONS

Jack E. Volder, "The CORDIC Trigonometric Computing Technique", IRE Transactions of Electronic Computers, May 1959.*
Frank W. Rafaelli, Low-Cost I.F Digital Demodulator for AM, FM and Digital Broadcasts, Nov. 28, 1999.*

* cited by examiner

*Primary Examiner*—Chieh M. Fan
*Assistant Examiner*—Aristocratis Fotakis
(74) *Attorney, Agent, or Firm*—Edward W. Callan

(57) ABSTRACT

A carrier frequency in a filtered received M-ary phase-shift keyed (MPSK) modulated signal having in-phase and quadrature components is detected by processing the filtered received signal to remove modulation components and thereby generate a test signal at the carrier frequency; processing the test signal to provide an amplitude spectrum of samples at different test frequencies; and processing the amplitude spectrum to detect the carrier frequency in accordance with the test frequency at which there is a test statistic of the highest magnitude. The magnitude of the test statistic is determined by processing a signal statistic in relation to a noise statistic. The signal statistic is the amplitude of the largest-amplitude sample. The filtered received signal is processed to provide approximate values of the modulus of the received signal and the phase of the received signal; and the approximate modulus and phase values are processed to generate the test signal.

24 Claims, 12 Drawing Sheets

CARRIER FREQUENCY DETECTION FOR SIGNAL ACQUISITION

BACKGROUND OF THE INVENTION

The present invention generally pertains to communication signal processing and is particularly directed to detecting a carrier signal in a received modulated signal for enabling acquisition of the received signal for demodulation in a digital receiver.

Received M-ary phase-shift keyed (MPSK) modulated signals, such as Binary PSK (BPSK), Quaternary PSK (QPSK) and Offset QPSK (OQPSK) modulated signals, with random unknown data and a frequency error relative to the receiver's local oscillator frequency of greater than about five-percent of the symbol rate of the received signal require some type of carrier-signal detection for heavily coded data, which implies a signal that may be received with a low signal-to-noise (SNR) ratio. MPSK modulated signals have in-phase and quadrature components. M is the integer 2 for BPSK signals and the integer 4 for QPSK and OQPSK signals.

A known prior art method of detecting a carrier frequency in a received MPSK modulated signal includes the steps of: (a) filtering the received signal to pass the received signal in a band of frequencies including a carrier frequency at which the signal was received; (b) processing the filtered received signal to remove modulation components and thereby generate a test signal at the carrier frequency; and (c) processing the test signal to provide to detect the carrier frequency.

In accordance with one known prior art technique, the test signal is processed to provide an amplitude spectrum of samples at different test frequencies; and the amplitude spectrum is processed to detect the carrier frequency in accordance with the test frequency at which there is a test statistic of the highest magnitude.

SUMMARY OF THE INVENTION

The present invention provides a method of detecting a carrier frequency in a received modulated signal, comprising the steps of:

(a) filtering the received signal to pass the received signal in a band of frequencies including a carrier frequency at which the signal was received;

(b) processing the filtered received signal to remove modulation components and thereby generate a test signal at the carrier frequency;

(c) processing the test signal to provide an amplitude spectrum of samples at different test frequencies; and (d) processing the amplitude spectrum to detect the carrier frequency in accordance with the test frequency at which there is a test statistic of the highest magnitude;

wherein step (d) comprises the steps of:

(e) determining the magnitude of the test statistic by processing a signal statistic in relation to a noise statistic, wherein the signal statistic is the amplitude of the largest-amplitude sample; and (f) determining the noise statistic by averaging the amplitudes of samples outside of an exclusion region that includes the largest-amplitude sample, a number of samples immediately above the spectral position of largest-amplitude sample and a number of samples immediately below the spectral position of the largest-amplitude sample.

In a further aspect, the present invention provides a method of detecting a carrier frequency in a received modulated signal, comprising the steps of:

(a) filtering the received signal to pass the received signal in a band of frequencies including a carrier frequency at which the signal was received;

(b) processing the filtered received signal to remove modulation components and thereby generate a test signal at the carrier frequency;

(c) processing the test signal to provide an amplitude spectrum of samples at different test frequencies; and (d) processing the amplitude spectrum to detect the carrier frequency in accordance with the test frequency at which there is a test statistic of the highest magnitude;

wherein step (d) comprises the steps of:

(e) segmenting the test signal into segments of limited bandwidth that are centered about different frequencies;

(f) processing a predetermined one of the limited-bandwidth segments that is centered about an assumed carrier frequency to determine whether the carrier frequency is within said one individual segment; and (g) when it is determined that the carrier frequency is not in the predetermined one limited-bandwidth segment, processing at least one of the other said limited-bandwidth segments until it is determined that the carrier frequency is within the limited-bandwidth segment currently being processed;

in combination with the step of:

(h) when the carrier frequency is detected, providing a frequency control word for use in acquiring the received signal at the detected carrier frequency;

wherein step (h) comprises the steps of:

(i) temporarily providing a coarse frequency control word that is representative of the center frequency of the individual limited-bandwidth segment currently being processed; and (j) composing the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

The present invention additionally provides systems for performing the above-described methods and computer readable storage media containing instructions for accomplishing various signal processing steps of such methods.

Additional features of the present invention are described with reference to the detailed description of the preferred embodiments.

DETAILED DESCRIPTION

Figure 1:
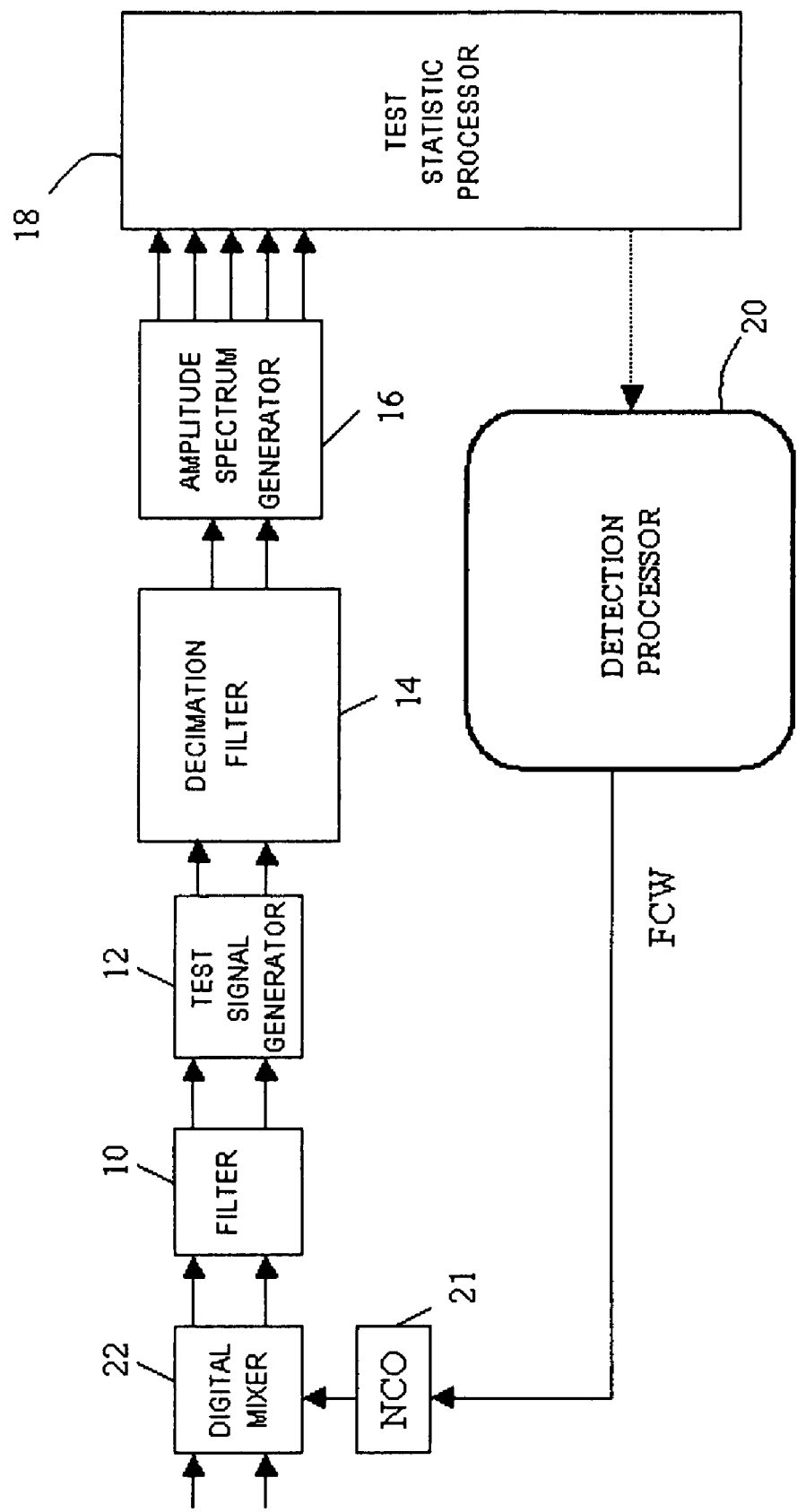
FIG. 1 is a block diagram of a preferred embodiment of a system in which the carrier frequency of a received MPSK modulated signal is detected in accordance with the present invention.

Referring to FIG. 1, a preferred embodiment of a carrier frequency detection system according to the present invention includes a first filter 10, a test signal generator 12, a decimation filter 14, an amplitude spectrum generator 16, a test statistic processor 18 and a detection processor 20. The system of FIG. 1 is adapted for detecting the carrier frequency of a received MPSK modulated signal.

The first filter 10 filters the received signal to pass the received signal in a band of frequencies including a carrier frequency at which the signal was received.

The test signal generator 12 processes the filtered received signal to remove modulation components and thereby generate a test signal at the carrier frequency.

The decimation filter 14 segments the test signal into segments of limited bandwidth that are centered about different frequencies.

The amplitude spectrum generator 16 processes the segmented test signal to provide an amplitude spectrum of samples at different test frequencies.

The test statistic processor 18 processes the amplitude spectrum of samples to provide test statistics for the different segments of the test signal.

The detection processor 20 processes the test statistics to detect the carrier frequency in accordance with the test frequency at which there is a test statistic of the highest magnitude. Upon detecting the carrier frequency, the detection processor 20 provides a frequency control word (FCW) to a number-controlled-oscillator 21 that is coupled to a digital mixer 22 for controlling the center frequency at which the received signal is received. When acquisition of the received signal is completed, the frequency control word $FCW_{Total}$ is held constant to enable pull-in, tracking, and demodulation.

The first filter 10 receives a MPSK modulated signal from the digital mixer 22 in a band of frequencies that includes the carrier frequency at which the received signal was transmitted. The MPSK modulated signal has an in-phase component I and a quadrature component Q The filter 10 filters the received signal and passes the filtered received signal to the test signal generator 12. In the preferred embodiment, the first filter 10 is a low-pass signal-matched filter that is adapted for matching the shape of the signal that is being used for transmitting the signal that is being received, such as an RRC (root-raised cosine). In alternative embodiments, the filter 10 is merely a low-pass filter. The filter 10 operates at a minimum sample rate PMOD samples per symbol. PMOD is the integer 2 or 4 of the respective MPSK signal.

Figure 2:
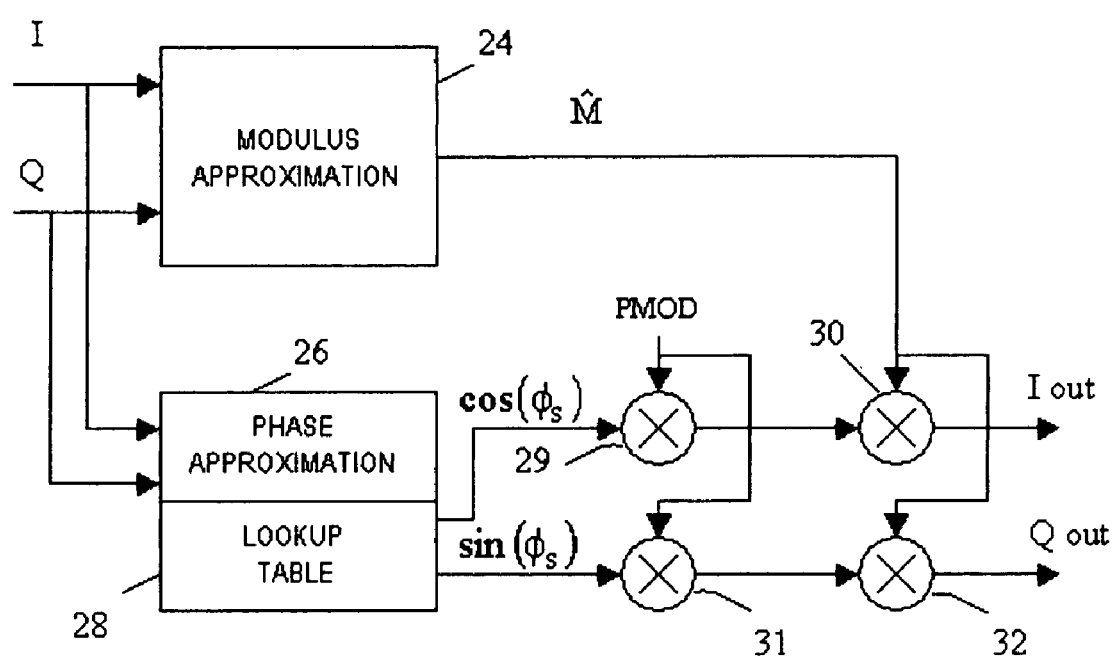
FIG. 2 is a block diagram of a preferred embodiment of the test signal generator included in the system shown in FIG. 1.

The test signal generator 12 processes the filtered received signal to remove modulation components and thereby generate a test signal at the carrier frequency. The test signal generator is implemented by a digital signal processor. Referring to FIG. 2, a preferred embodiment of the test signal generator 12 includes a modulus approximation module 24, a phase approximation module 26, a cos(φs) and sin(φs) lookup table 28 and four digital multipliers 29, 30, 31, 32.

The modulus approximation module 24 approximates the value of the modulus |S| in accordance with:

$$|S| = \sqrt{I^2 + Q^2} \quad [\text{Eq. 1}]$$

wherein I and Q are the respective magnitudes of the in-phase and quadrature components of the received signal.

The phase approximation module 26 approximates the value of the phase φs in accordance with:

$$\phi_S = \text{TAN}^{-1}\left(\frac{Q}{I}\right). \quad [\text{Eq. 2}]$$

Figure 3:
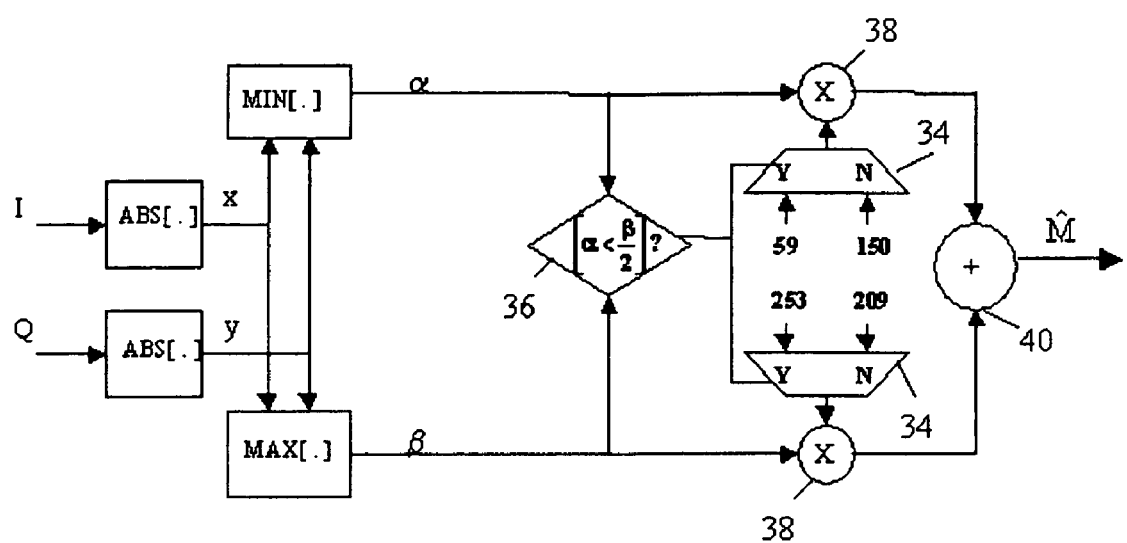
FIG. 3 is a diagram of a modulus approximation algorithm performed by a preferred embodiment of the modulus approximation module included in the test signal generator shown in FIG. 2.

A diagram of a modulus approximation algorithm performed by a preferred embodiment of the modulus approximation module 24 to approximate the modulus of the received signal is shown in FIG. 3, in which the approximate value of the modulus is shown as $\hat{M}$. The modulus approximation module 24 approximates the modulus of the received signal efficiently by using piecewise linear functions of the I and Q components of the received signal.

Figure 4:
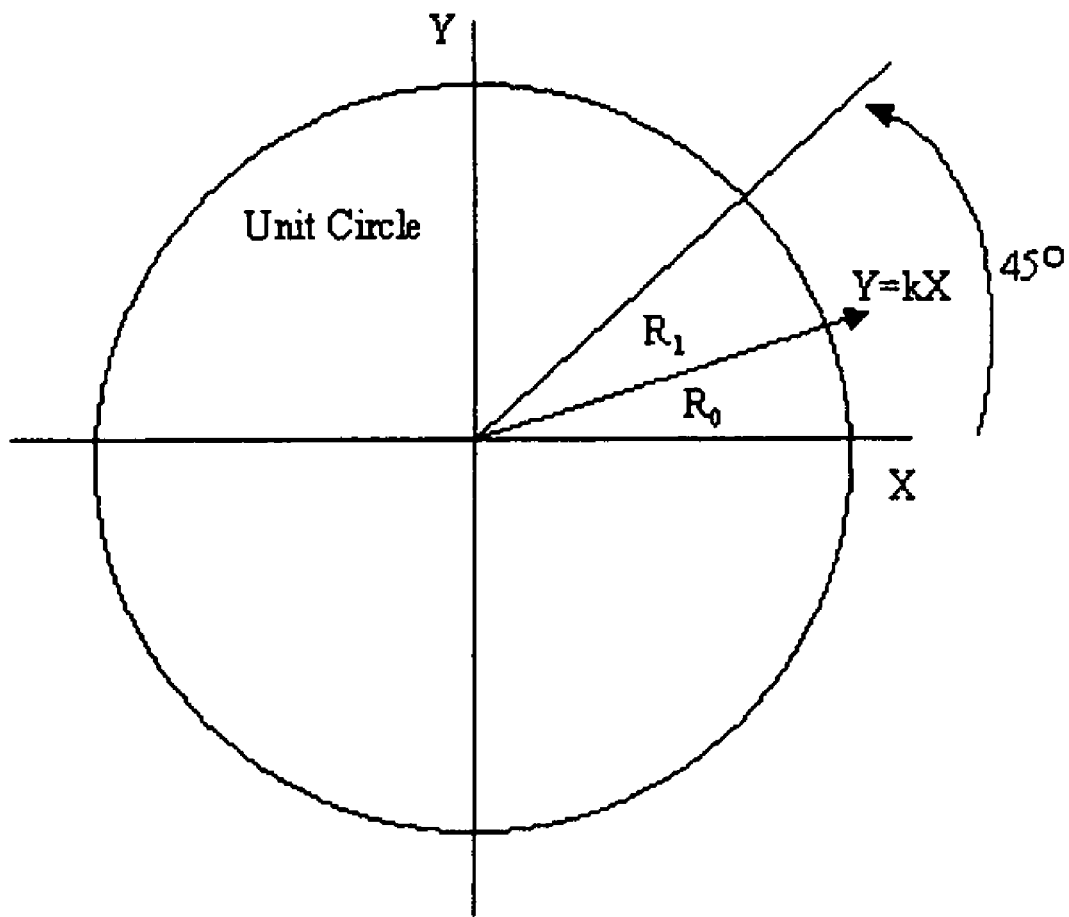
FIG. 4 shows the geometry for the modulus approximation algorithm of FIG. 3.

Referring to FIG. 4, which shows a unit circle superimposed on the X and Y axes, the modulus approximation can be made for any magnitude M without a loss of generality. Accordingly, for the purpose of explaining this approach, it is chosen that M=1. The range of the approximation may be restricted to a 45-degree wedge by utilizing the quantities:

$$\alpha = \text{Min}(|X|, |Y|) \quad [\text{Eq. 3}]$$

and $$\beta = \text{Max}(|X|, |Y|) \quad [\text{Eq. 4}]$$

and forming a vector $\beta_{\vec{i}} + \alpha_{\vec{j}}$ where the i-direction lies along the X-axis and the j-direction lies along the Y axis. Since α is always less than β and the signs are always positive, the vector always forms an angle of 45 degrees or less. The magnitude of modulus $\hat{M}$ is approximated by a linear function of α and β:

$$\hat{M} = C_0 \alpha + C_1 \beta. \quad [\text{Eq. 5}]$$

In FIG. 4, the 45-degree range-of-approximation wedge is divided into two regions $R_0$ and $R_1$. Different nonlinear functions are defined for M over the regions $R_0$ and $R_1$ of the wedge. This technique of approximating nonlinear functions by sets of linear functions defined over different regions is known as approximation by piecewise linear functions.

To minimize the quantity f(M−$\hat{M}$), which is an error function of the difference between the actual and approximated magnitudes of the modulus, MiniMax functions are used to provide approximate values $C_0$ and $C_1$.

A simple set of regions is given by defining $R_0$ from Y=0 to Y=½ X, and, $R_1$ from Y=½ X to Y=X. The following system of equations is thereby applicable:

Over $R_0$: Find:

$$\{C_{0R_0}, C_{1R_0} = \text{Min}\{\text{Max}[|1 - C_{0R_0}\sin\phi - C_{1R_0}\cos\phi|]\} \forall \{\phi\} \in R_0 \quad [\text{Eq. 6}]$$

Over $R_1$: Find:

$$\{C_{0R_1}, C_{1R_1} = \text{Min}\{\text{Max}[|1 - C_{0R_1}\sin\phi - C_{1R_1}\cos\phi|]\} \forall \{\phi\} \in R_1 \quad [\text{Eq. 7}]$$

For M=1, the above equations are solved by using the MiniMax error function in an optimization toolbox in MATLAB:

$$\text{Over } R_0\left\{\alpha < \frac{\beta}{2}\right\}: \hat{M} = 0.232\alpha + 0.9865\beta \quad [\text{Eq. 8}]$$

$$\text{Over } R_1\left\{\alpha \geq \frac{\beta}{2}\right\}: \hat{M} = 0.588\alpha + 0.817\beta \quad [\text{Eq. 9}]$$

The actual values of the coefficients indicated in Equations 8 and 9 that are used in the physical implementation of the preferred embodiment are fixed point values that are represented as integer values and are determined by scaling the floating point values by an integer power of two and either rounding or truncating the result to realize the implemented coefficients shown in FIG. 3.

Referring again to the diagram of the magnitude approximation algorithm shown in FIG. 3, it is seen that the values of $\alpha$ and $\beta$ are provided in accordance with Equations 3 and 4 by using MiniMax functions; and that the coefficients by which $\alpha$ and $\beta$ are multiplied to provide the respective values of $C_0$ and $C_1$ in Equation 5 are provided in accordance with Equations 8 and 9.

The respective values 34 of the coefficients $C_0$ and $C_1$ are selected by the decision block 36 in accordance with whether $\alpha < \beta/2$. The coefficients $C_0$ and $C_1$ are 8-bit unsigned two's complement numbers and each multiplication by the digital multipliers 38 is followed by a rounding down of the eight LSBs. The outputs of the two digital multipliers 38 are summed by the digital adder 40 to provide the approximate value $\hat{M}$ of the modulus.

The magnitude approximation module 24 uses rounding and truncation in performing the magnitude approximation algorithm shown in FIG. 3. This algorithm is very sensitive to quantization. Magnitude values are used rather than power values in order to conserve on the number of bits used in the subsequent detection processing.

Figure 5:
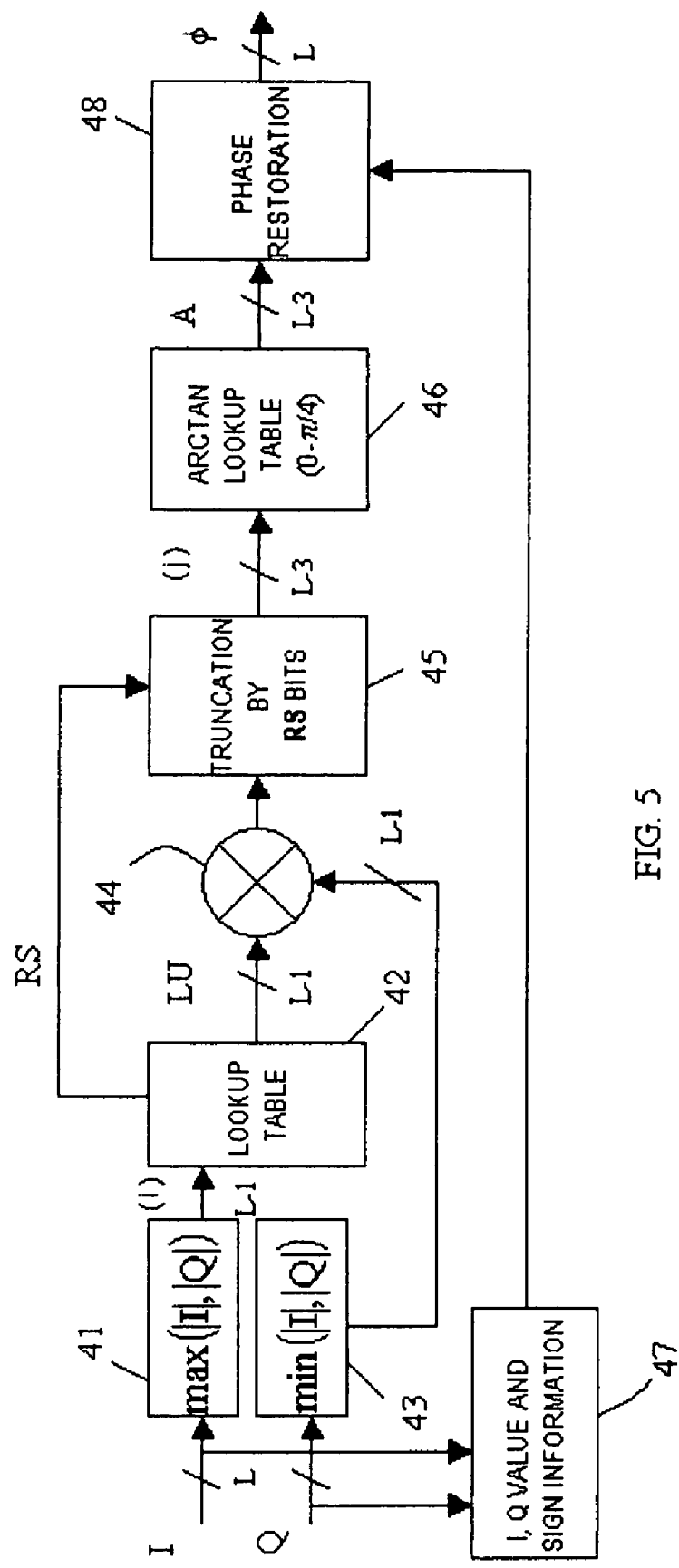
FIG. 5 is a block diagram of a preferred embodiment of the phase approximation module included in the test signal generator shown in FIG. 2.

Approximation of the phase value by the phase approximation module 26 is accomplished in a manner that enhances the precision of the approximation notwithstanding the relative magnitudes of the I and Q components of the test signal. Referring to FIG. 5, the magnitudes of the I and Q components are represented by L-bit binary numbers. In the preferred embodiment L=8.

The I and Q components are processed, as shown at 41, to provide an L−1 bit input value (i) that is the larger of the respective absolute values of the I and Q components. The input value (i) is used to access an integer divide look-up table (LUT) 42. An integer divide number LU, which is provided from the look-up table 42 in response to the input value (i), is representative of a multiple of a scale factor $2^K$ and the reciprocal of the larger of the respective absolute values of the I and Q components.

$$LU = 2^K/\text{MAX}(|I|,|Q|). \quad [\text{Eq. 10}]$$

The constant K depends on the relative magnitude of the value MAX(|I|,|Q|). The scaling factor $2^K$ is chosen to satisfy the condition that constant precision is maintained throughout the range [0,1] that the fraction 1/MAX(|I|,|Q|) may assume. The choice of K is such that the result of the lookup of the value LU is restricted to be within an eight-bit range and is implied to be positive. Eight bits of phase information is adequate for processing BPSK, QPSK, or OQPSK modulated data.

Figure 6:
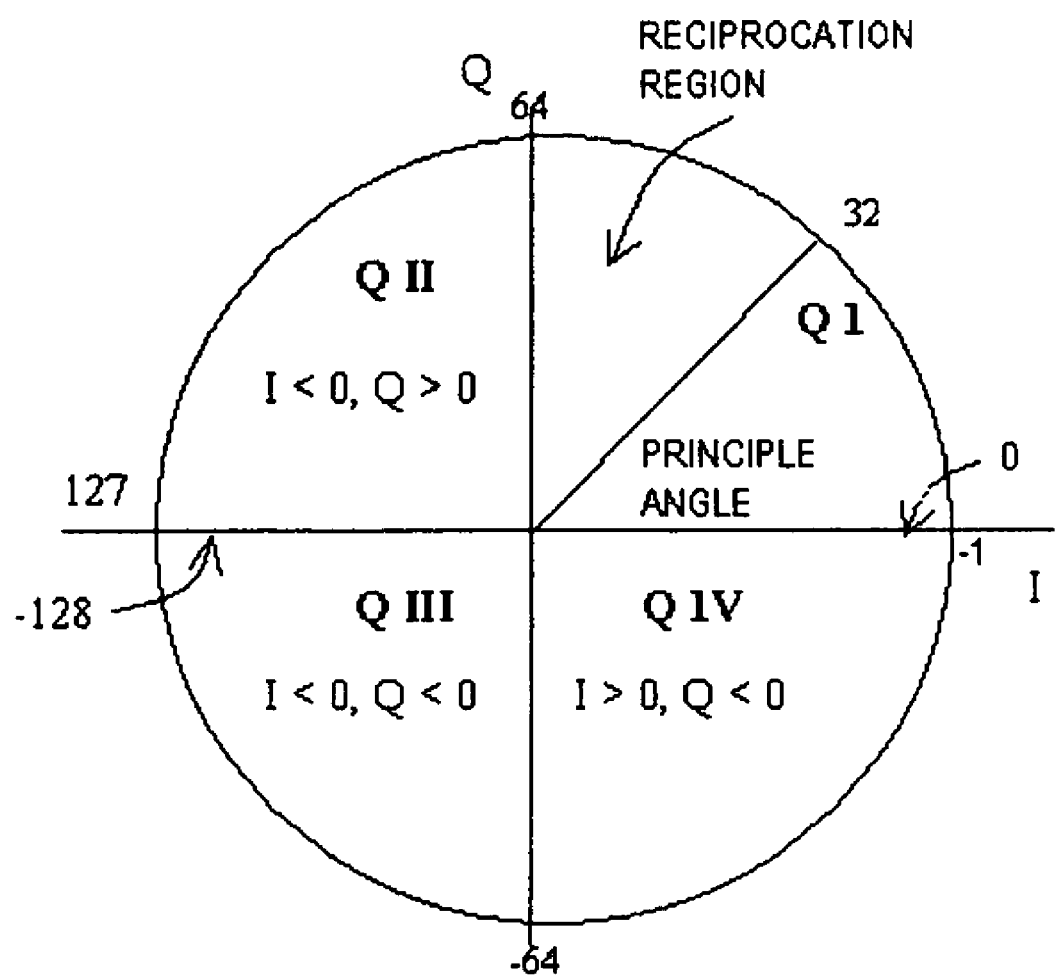
FIG. 6 shows the role of reciprocation and quadrant mapping for the phase approximation module of FIG. 5.

FIG. 6 shows the role of the reciprocation and quadrant mapping for the phase estimate. In order to maintain precision throughout the entire range that the denominator can assume the $2^K$ factor is applied in the construction of the lookup table. Note that for such mapping $\pi$ equals 128.

The lookup table 42 consists of positive integers such that for N-bit signed I and Q, there are $2^{N-1}$ unsigned entries representing $2^K/\max(|I|,|Q|)$. Each table input value (i) has a floor value of $(2^K/X+0.5)$ in order to produce a rounded result.

For an embodiment in which the I and Q components have eight-bit values, the integer-divide values LU that are provided from the look-up table 42 in response to access by a MAX(|I|,|Q|)-value (i) are shown in Table 1.

The integer-divide function is implemented by a floating point operation such that a scale factor S is chosen so that the lookup table entry will have for example, seven bits of magnitude information when L=8. For this example:

$$Y \cdot LUT\left(\frac{1}{X}\right) \Rightarrow \frac{Y}{2^{RS}} \cdot \left\lfloor \frac{2^7}{X + 0.5} \cdot S \right\rfloor \quad [\text{Eq. 11}]$$

For $$\frac{Y}{X}$$

wherein $Y \leq X$ and both X and Y are positive, the scale factor $S = 2^K$ is chosen to ensure that the quantity in brackets has the desired number of bits of precision (7 in this case). Another way to state this is that S is a power of 2 such that the integer divide number LU lies in the range: $64 \leq [\cdot] \leq 128$. For example, for an integer divide number LU of X=69, $$64 \leq \frac{128}{69.5} \cdot S < 128$$

is formed and solved for a power K of 2. This yields the result S=64. The lookup value is the floor-value function of the term in brackets with S=64, (which yields 117). The number of right shifts (RS) is given by $2 + \text{LOG}_2(S)$ (equal to 8) which completes the table entry.

TABLE 1

| Integer Division Lookup Table |
| --- |
| (i), LU, RS |
| (0), 127.1 |
| (1), 127.2 |

TABLE 1-continued

Integer Division Lookup Table (2), 102.3
(3), 73.3
(4), 114.4
(5), 93.4
(6), 79.4
(7), 68.4
(8), 120.5
(9), 108.5
(10), 98.5
(11), 89.5
(12), 82.5
(13), 76.5
(14), 71.5
(15), 66.5
(16), 124.6
(17), 117.6
(18), 111.6
(19), 105.6
(20), 100.6
(21), 95.6
(22), 91.6
(23), 87.6
(24), 84.6
(25), 80.6
(26), 77.6
(27), 74,6
(28), 72,6
(29), 69.6
(30), 67.6
(31), 65.6
(32), 126.7
(33), 122.7
(34), 119.7
(35), 115.7
(36), 112.7
(37), 109.7
(38), 106.7
(39), 104.7
(40), 101.7
(41), 99.7
(42), 96.7
(43), 94.7
(44), 92.7
(45), 90.7
(46), 88.7
(47), 86.7
(48), 84.7
(49), 83.7
(50), 81.7
(51), 80.7
(52), 78.7
(53), 77.7
(54), 75.7
(55), 74.7
(56), 72.7
(57), 71.7
(58), 70.7
(59), 69.7
(60), 68.7
(61), 67.7
(62), 66.7
(63), 65.7
(64), 127.8
(65), 125.8
(66), 123.8
(67), 121.8
(68), 120.8
(69), 118.8
(70), 116.8
(71), 115.8
(72), 113.8
(73), 111.8
(74), 110.8
(75), 109.8
(76), 107.8
(77), 106.8
(78), 104.8
(79), 103.8

TABLE 1-continued

Integer Division Lookup Table (80), 102.8
(81), 101.8
(82), 99.8
(83), 98.8
(84), 97.8
(85), 96.8
(86), 95.8
(87), 94.8
(88), 93.8
(89), 92.8
(90), 91.8
(91), 90.8
(92), 89.8
(93), 88.8
(94), 87.8
(95), 86.8
(96), 85.8
(97), 84.8
(98), 83.8
(99), 82.8
(100), 82.8
(101), 81.8
(102), 80.8
(103), 79.8
(104), 78.8
(105), 78.8
(106), 77.8
(107), 76.8
(108), 76.8
(109), 75.8
(110), 74.8
(111), 73.8
(112), 73.8
(113), 72.8
(114), 72.8
(115), 71.8
(116), 70.8
(117), 70.8
(118), 69.8
(119), 69.8
(120), 68.8
(121), 67.8
(122), 67.8
(123), 66.8
(124), 66.8
(125), 65.8
(126), 65.8
(127), 64.8

TABLE 2

Arctangent Lookup Table (j), A (0), 0
(1), 1
(2), 3
(3), 4
(4), 5
(5), 6
(6), 8
(7), 9
(8), 10
(9), 11
(10), 12
(11), 14
(12), 15
(13), 16
(14), 17
(15), 18
(16), 19
(17), 20
(18), 21
(19), 22

TABLE 2-continued

Arctangent Lookup Table

| (j), A |
|---|
| (20), 23 |
| (21), 24 |
| (22), 24 |
| (23), 25 |
| (24), 26 |
| (25), 27 |
| (26), 28 |
| (27), 28 |
| (28), 29 |
| (29), 30 |
| (30), 31 |
| (31), 31 |

The I and Q components are also processed, as shown at 43, to provide an L−1 bit number MIN(|I|,|Q|) that is the smaller of the respective absolute values of the I and Q components. The number MIN(|I|,|Q|) is multiplied, as shown at 44, by the integer divide number LU to provide a binary number that is truncated by RS bits, as shown at 45, to provide an L−3 bit input value (j) to an arctangent look-up table (ARCTAN LUT) 46. Referring to Table, 2, in the look-up table 46, the arctangent is expressed in radians in accordance with a fixed-point arithmetic scale in which π radians equals 128.

The number of right-shift bits RS also is provided from the look-up table 42 in response to the input value (i), as shown in Table 1, for the embodiment in which L=8.

The input value (j) is equal to $2^K\{MIN(|I|,|Q|/MAX(|I|,|Q|)\}$. The output from the arctangent look-up table 46 is an L−3 bit value for an angle in the range (0-π/4).

The I and Q components are further processed, as shown at 47, to provide relative I, Q-value information and sign information. Such information is processed with the output from the arctangent look-up table 46 to restore the approximate value of the phase φ, as shown at 48.

The (0-π/2) range is restored in accordance with whether the value of I or the value of Q is in the denominator of the value (j). If the value of Q is larger than the value of I then the fraction was reciprocated to produce a value less than unity and as such must be compensated for. The identity $$TAN^{-1}(x) + TAN^{-1}\left(\frac{1}{x}\right) = \frac{\pi}{2}$$

is used to restore the (0-π/2) range. The phase approximation thus grows by one bit to a L−2 bit unsigned number, which is processed with the sign information for the I and Q components to restore the phase approximation to the full 2π range by providing an L-bit signed number representing the −π to +π range with the maximum positive value (127) corresponding to +π.

When the range (0-π/4) is represented by five bits, the resulting phase resolution is 1.4 degrees/LSB. The maximum error in this case is one-half of this interval or 0.7 degrees. Referring again to FIG. 2, an in-phase component $I_{OUT}$ of the test signal is generated in accordance with:

$$I_{Out}=|S|\cos(PMOD\cdot\phi_s),\qquad [Eq.\ 12]$$

wherein PMOD is the integer 2 when the received signal is a BPSK signal and the integer 4 when the received signal is either a QPSK signal or a OQPSK signal. Cos(φs) is provided from the lookup table 28 in accordance with the approximated value of φs. The digital multiplier 29 multiplies cos(φs) by PMOD and the digital multiplier 30 multiplies PMOD cos(φs) by the estimated value of the modulus S to provide the in-phase component $I_{OUT}$ of the test signal.

A quadrature component $Q_{OUT}$ of the test signal is generated in accordance with:

$$Q_{Out}=|S|\sin(PMOD\cdot\phi_s).\qquad [Eq.\ 13]$$

Sin(φs) is provided from the lookup table 28 in accordance with the approximated value of φs. The digital multiplier 31 multiplies sin(φs) by PMOD and the digital multiplier 32 multiplies PMOD sin(φs) by the value of the modulus S to provide the quadrature component $Q_{OUT}$ of the test signal.

Figure 7:
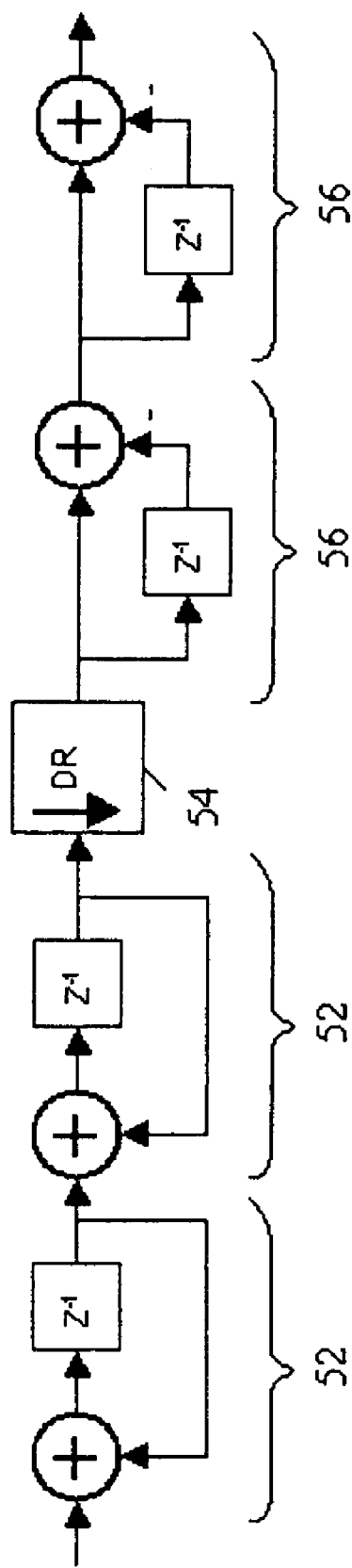
FIG. 7 is a block diagram of the type of decimation filter included in the system shown in FIG. 1.

Referring to FIG. 7, the decimation filter 14 shown in FIG. 1 utilizes a cascaded integrate/comb (CIC) architecture to segment the test signal into segments of limited bandwidth that are centered about different frequencies. Although the architecture shown in FIG. 7 is for a second-order CIC; in the preferred embodiment, the architecture is $4^{th}$ order CIC, which will decimate by 128. The second-order CIC is shown for purpose of illustrating CIC architecture in a less complex context. The CIC architecture includes several integration stages 52 followed by a decimator 54 and then several derivative sections 56 (the "comb").

A fourth-order CIC filter includes four integrators in cascade followed by a decimator (which merely passes the sample through to the comb section once every 128 integrator outputs) and then to four cascaded "combs" which essentially perform a series of numerical derivatives on the integrated result.

The bit growth through the CIC section is very large and the filter has a DC gain of:

$$G_{DC}=DR^P\qquad [Eq.\ 14]$$

wherein P is the order of the CIC.

The nominal register sizes for all of the CIC stages is described in "An Economical Class of Digital Filters for Decimation and Interpolation", E. Hogenauer, IEEE Trans. On Acoustics, Speech & Sig. Proc., Vol ASSP-29, April 1981, pages 155-162. The nominal register size is given by:

$$B=P\cdot LOG_2(DR)+B_{In}-1\ Bits\qquad [Eq.\ 15]$$

Figure 8:
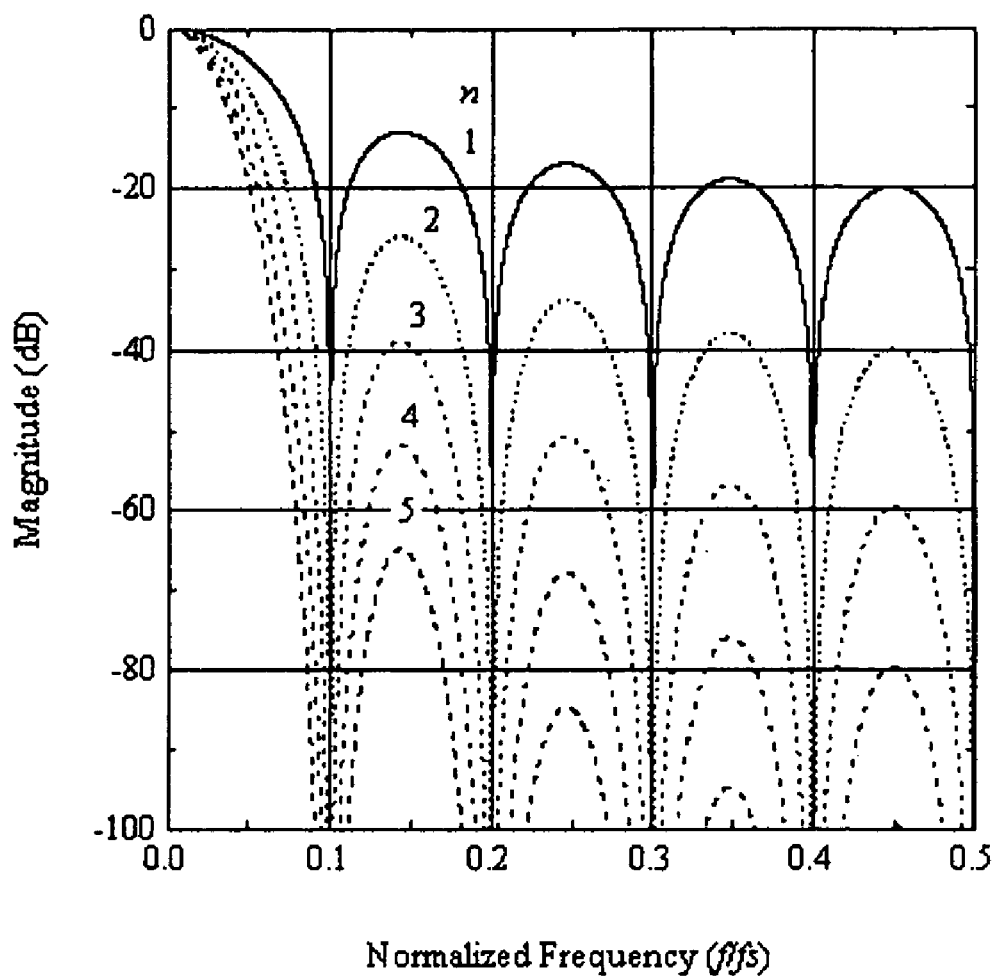
FIG. 8 shows the frequency response of the signal decimator of FIG. 7.

The key parameters for the CIC are its order P, (number of integrator and comb stages) and the decimation rate, DR. The CIC has a classical (Sin X/X)$^P$ spectral shape and an example is shown in FIG. 8 for the case of a decimation by 10. The curves are indexed by P. An increase in order reduces aliased energy after the decimation stage at the cost of larger register size and more rolloff distortion.

The amplitude spectrum generator 16 shown in FIG. 1 utilizes a Fast Fourier Transform (FFT) to separately process the individual limited-bandwidth segments of the test signal to provide the amplitude spectrum of samples at different test frequencies. Each spectral-sample-point position is at a different test frequency and is represented by a different FFT bin number. The Fast Fourier Transform is described in "The Fast Fourier Transform and its Applications", Pages 148-152, E. Bingham, Prentice Hall, 1988. The preferred embodiment utilizes a 32-point FFT. By separately processing the individual limited-bandwidth segments of the test signal, the size of the amplitude spectrum generator 16 is significantly reduced in relation to the size required for FFT processing over the full bandwidth of the test signal.

Figure 9:
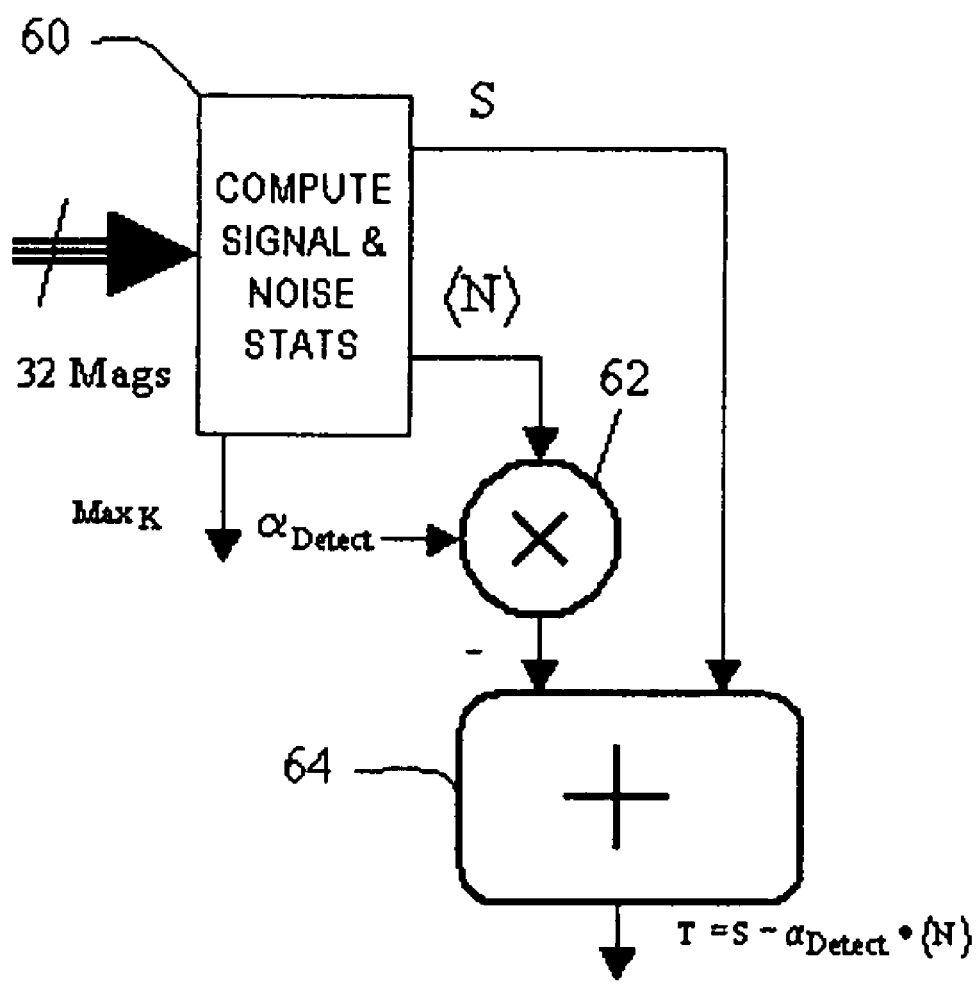
FIG. 9 is a block diagram of the routines performed by a preferred embodiment of the test statistic processor included in the system shown in FIG. 1.

Referring to FIG. 9, the test statistic processor 18 shown in FIG. 1 is implemented in a digital signal processor, which is adapted for performing a routine 60 of generating signal and noise statistics, a multiplication routine 62 and a negative addition (subtraction) routine 64. During the routine 60 the amplitude spectrum of each individual test signal segment is processed to generate a signal statistic S and a noise statistic N for the individual segment. The signal statistic S is the amplitude of the largest-amplitude sample in the individual limited-bandwidth segment. The routine 60 determines the noise statistic N by averaging the amplitudes of samples outside of an exclusion region that includes the largest-amplitude sample, a number of samples immediately above the spectral position of largest-amplitude sample and a number of samples immediately below the spectral position of the largest-amplitude sample.

The multiplication routine 62 causes the noise statistic N to be multiplied by a detection parameter $\alpha_{DETECT}$ and provides the multiple $\alpha_{DETECT} \cdot N$. The detection parameter $\alpha_{DETECT}$ is a predetermined quantity divided by the number of samples that are averaged to determine the noise statistic N.

The subtraction routine 64 determines the magnitude of the test statistic T for the individual segment by causing the multiple $\alpha_{DETECT} \cdot N$ to be subtracted from the signal statistic S.

The test statistic processor 18 thereby processes the amplitude spectrum of each individual segment to determine the magnitude T of the test statistic for the individual segment.

Spiral Search

Figure 10:
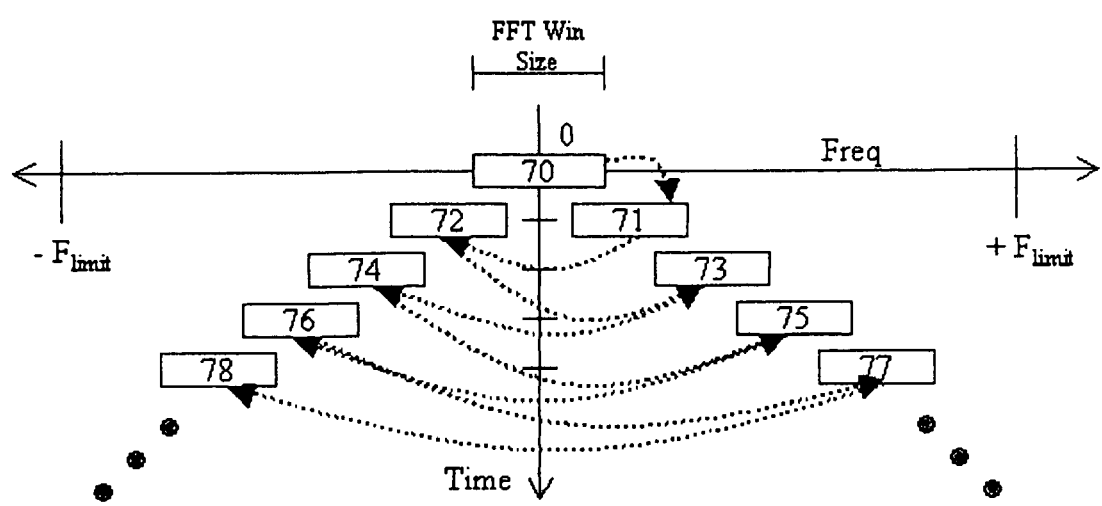
FIG. 10 illustrates a spiral search pattern performed by the detection processor of FIG. 11.

Referring to FIG. 10, the detection processor 20 shown in FIG. 1 searches for the carrier frequency by performing a spiral search, which begins by processing a predetermined one 70 of the individual limited-bandwidth segments that is centered about an assumed carrier frequency to determine whether the carrier frequency is within said one individual segment 70. When it is determined that the carrier frequency is not within the predetermined one limited-bandwidth segment 70, at least one of the other said limited-bandwidth segments 71, 72, 73, 74, 75, 76, 77, 78 is processed until it is determined that the carrier frequency is within the limited-bandwidth segment currently being processed. The frequency bands of the limited-bandwidth segments 70, 71, 72, 73, 74, 75, 76, 77, 78 overlap. During each individual limited-bandwidth segment 70, 71, 72, 73, 74, 75, 76, 77, 78 of the spiral search illustrated in FIG. 10, a test statistic T is determined by the test statistic processor 18 in the manner described above with reference to FIG. 9.

The following parameters pertain to a preferred embodiment of the spiral search: SNR Dependent Parameters (which depend on coding options and modulation):

$N_{Dwell}$, the number of FFTs/Dwell period
$\alpha_{Detect}$, the detection parameter
$N_{Det}$, the required number of coincidence detections required per dwell period to indicate signal presence Symbol Rate Dependent Parameters:

$F_{step}$, the FFT search step size
$\Delta_{Bin}$, the FFT bin spacing
$|F_{limit}|$, the absolute value of the search limit
$F_{OL}$, the overlap factor
R, the number of bin positions used for coincidence detection (1, 2, 3, or 4)
$N_{Dwell}$, the number of FFTs/Dwell period (due to Doppler rate considerations relative to the symbol rate)
$N_{Det}$, the number of coincidence detections required per dwell period to indicate carrier signal presence (due to Doppler rate considerations relative to the symbol rate)

Constants

DR=128
$P_{Mod}$=(1 for QPSK, 2 for BPSK)
FFT Size=32 Bins ($N_{FFT}$
NCO=25 bits
$Dopp_{max}$=30 kHz
$\dot{F}_{Dopp}$=1 kHz/Sec
Exclusion Region=3 (6 total bins excluded)
Number of Noise Bins=24

The spiral search is performed by alternately moving away from the assumed carrier frequency (the most likely spectral position) in a manner that efficiently sweeps the uncertainty range in both the positive and negative directions on alternate dwells. FIG. 10 shows the FFT windows for nine dwell periods. Multiple FFTs are processed during each dwell period.

The spiral search is implemented by stepping through the uncertainty range in steps of $F_{Step}$ and applying the appropriate sign changes to cover a positive and negative 30-kHz uncertainty region (measured pre-nonlinearity). The spiral search continues until the carrier is found and the search limit window lies between $+/-F_{limit}$. The formula for the bandwidth $B_{FFT}$ of each FFT-processed individual limited-bandwidth segment is given by:

$$B_{FFT} = \frac{4 \cdot R_{sym}}{DR}(Hz) \quad [\text{Eq. 16}]$$

wherein: DR is the CIC decimation ratio and $R_{sym}$ is symbol rate (Sym/Sec).

The dwell NCO frequency step between the individual limited-bandwidth segments 70, 71, 72, 73, 74, 75, 76, 77, 78 shown in FIG. 10 in terms of the register bit-width of the NCO 21 is given by:

$$F_{Step} = \frac{2^{NCO-2} \cdot B_{FFT} \cdot F_{OL} \cdot S_{Mod}}{R_{sym}} \quad [\text{Eq. 17}]$$

wherein: $F_{OL}$ is the frequency overlap factor and $S_{MOD}$ is the modulation dependent factor (1 for QPSK, 2 for BPSK).

The reason that the factor $2^{NCO-2}$ is used is to provide a conversion to the NCO input precision in bits for the FCW assuming a sampling frequency of four samples/symbol at the acquisition processor input.

The spacing between bins for the 32-point FFT is given by:

$$\Delta_{Bin} = \frac{2^{NCO-2} \cdot B_{FFT} \cdot S_{Mod}}{DR \cdot R_{sym}} \quad [\text{Eq. 18}]$$

The absolute value of the Frequency Search Limit $F_{limit}$, is given by:

$$|F_{limit}| = \frac{2^{NCO-2} \cdot Dopp_{max}}{R_{sym} \cdot S_{Mod}} \quad [\text{Eq. 19}]$$

wherein $Dopp_{max}$ is the maximum one-sided total frequency uncertainty that is specified.

The overlap factor $F_{OL}$ is chosen to ensure that under the worst case Doppler rate (post-nonlinearity) for the given modulation type, the spiral search will not have any blind search conditions. That is to say: for the required number of FFTs to observe per dwell period $N_{Dwell}$, the required number of coincidence detections $N_{Det}$, the maximum Doppler rate, and the modulation order (equal to nonlinearity order), the carrier will not move across the FFT bandwidth $B_{FFT}$ unobserved by the FFT processor.

At the lowest SNR case, which is for QPSK/OQPSK modulation with a rate ½ convolutional code (~64 ksym/sec), eight FFTs/Dwell ($N_{Dwell}=8$) are required to reliably detect the signal with acceptable false alarm performance. In this case, under worst case Doppler of ~1 kHz/Sec the generated tone can move a total of one FFT Bin/FFT period or a total of 8 FFT bins per dwell—post $N^4$ nonlinearity. In order to not miss the signal in the case where the signal is moving opposite the search direction (e.g., worst case negative Doppler rate but positive frequency offset) a choice of:

$$F_{OL} = \frac{12}{4 \cdot 32}$$

works well. This equates to the frequency stepsize along the positive or negative axis in FIG. 2 being 12 FFT bins per 8 FFT dwell period. It should be noted that for this low data rate the frequency multiplied Doppler rate actually exceeds the search rate when the Doppler rate and absolute Frequency offset both have the same sign. This is OK because when the carrier reaches its limit or if the rate changes sign the spiral search will capture the full 8 observations inside the dwell period. The actual search rate is +/−6 FFT bins/dwell period because positive frequencies are alternately searched with their negative frequency counterpart thus reducing the overlap factor of 12 FFT bins by two. Since the maximum rate in this case is eight FFT bins/dwell the carrier under worst case Doppler can temporarily "outrun" the detector. For an uncoded QPSK 32 ksym/sec rate the carrier can move four FFT bins/FFT period but the SNR is much higher so the number of dwells can be dramatically less and the $\alpha_{Detect}$ can be much larger to ensure good detection and false alarm performance.

When the carrier frequency is detected, the detection processor 20 provides the frequency control word FCW for use in acquiring the received signal at the detected carrier frequency.

Figure 11:
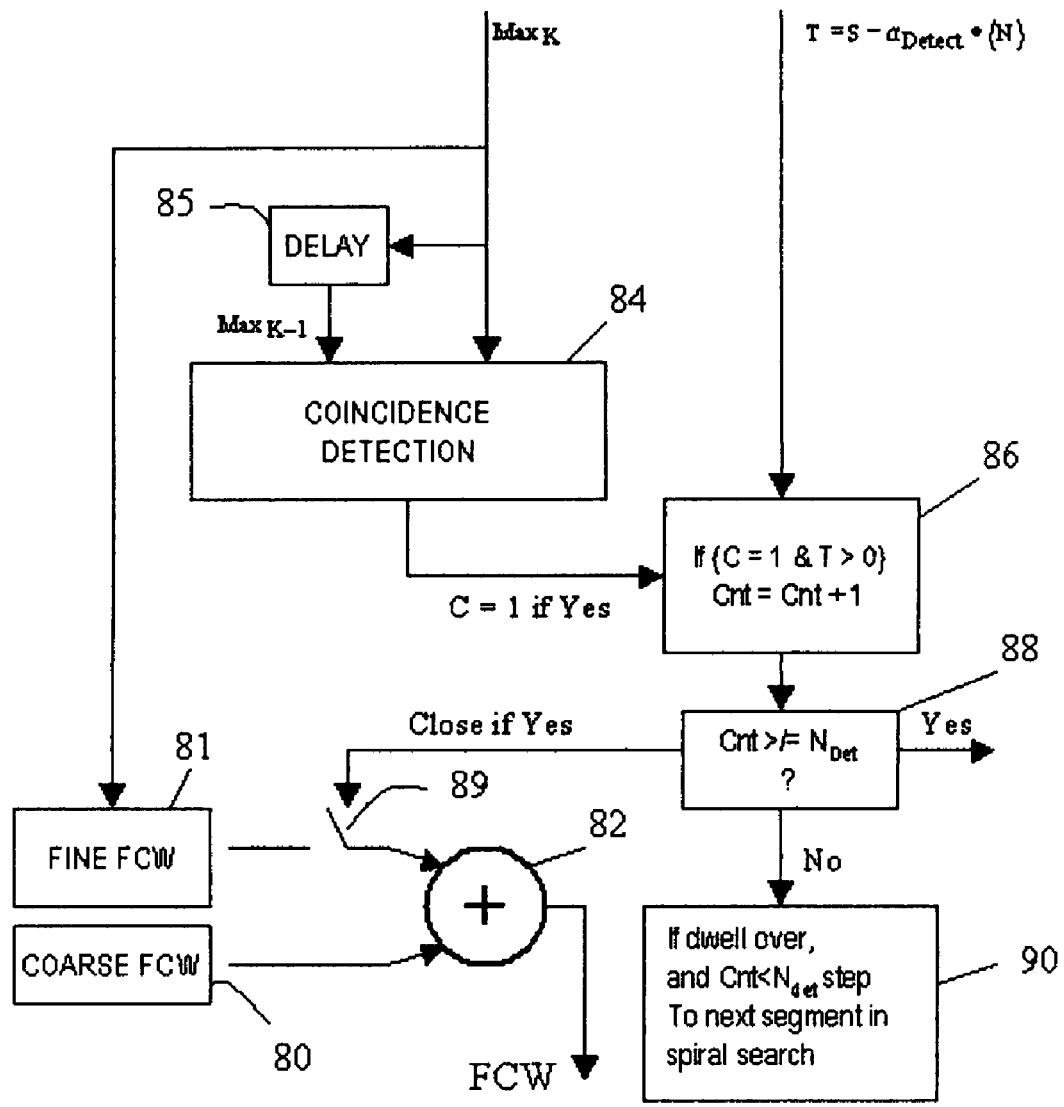
FIG. 11 is a diagram of the routines performed by a preferred embodiment of the detection processor included in the system shown in FIG. 1.

Referring to FIG. 11, the detection processor 20 shown in FIG. 1 is implemented in a digital signal processor. During a carrier-frequency-detection routine performed by the detection processor 20, a coarse frequency control word 80 that is representative of the center frequency of the individual limited-bandwidth segment currently being processed is temporarily stored; and when the carrier frequency is detected in accordance with the test frequency at which there is a test statistic T of the highest magnitude, the frequency control word FCW that is provided is composed by combining the currently provided coarse frequency control word 80 with a fine frequency control word 81 that is representative of a frequency-offset from the center frequency of the currently processed individual bandwidth segment to the test frequency at which the test statistic T of the highest magnitude is detected.

The parameter $F_{step}$ is used to define the coarse frequency control word 80. $F_{step}$ is determined in accordance with Equation 17, above.

The FFT bin number for the spectral position within the individual limited-bandwidth segment at which the test statistic T is of the highest magnitude within the entire amplitude spectrum for all of the individual limited-bandwidth segments is used to define the fine frequency control word 81.

Coincidence Detection

The detection processor 20 performs a coincidence detection routine 84 to determine whether the spectral position at which the test statistic T within the segment k currently being processed is of the highest magnitude is also the spectral position within all of the individual limited-bandwidth segments at which the test statistic T is of the highest magnitude.

During the coincidence detection routine 84, the bin number $MAX_K$ BIN# of the spectral position within segment k at which the test statistic T is of the highest magnitude is processed with the bin number $MAX_{K-1}$ BIN# of the spectral position within the previously processed segment k−1 at which the test statistic T is of the highest magnitude. The bin number $MAX_{K-1}$ BIN# is provided from a delay register 85. Coincidence C is detected, C=1, when the absolute value of the difference between the number of bin positions indicated by the respective values of $MAX_K$ BIN# and $MAX_{K-1}$ BIN# is less than the coincidence parameter R. The coincidence parameter R is dependent upon the modulation scheme and the symbol rate.

The selection of the coincidence parameter R is a function of the modulation order (PMOD), The FFT size $N_{FFT}$, the Doppler rate that must be supported $\dot{F}_{Dopp}$, the decimation ratio of the CIC filter DR, the number of samples/symbol into the acquisition block $N_{Samp/Sym}$, and the symbol rate $R_{Sym}$, and the number of dwells per segment $N_{Dwell}$ and is given as follows:

$$R = \text{Floor}\left(N_{Dwell} \cdot \frac{PMOD \cdot \dot{F}_{Dopp} \cdot N_{FFT}^2 \cdot DR^2}{N_{Samp/Sym}^2 \cdot R_{Sym}^2} + 0.5\right) \quad [\text{Eq. 20}]$$

Figure 12:
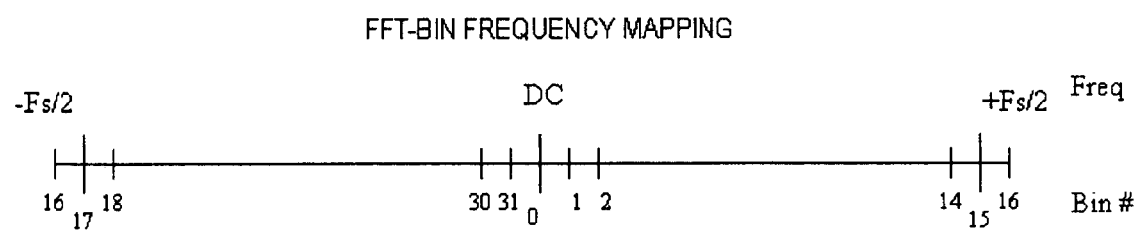
FIG. 12 shows the relationship between the test frequencies within an individual limited-bandwidth segment and the FFT spectral position (bin) numbers for a 32-point amplitude spectrum provided by the amplitude spectrum generator included in the system of FIG. 1 and processed by the detection processor of FIG. 11.

The numbering of the bins is shown in FIG. 12, wherein the spectral position of center frequency for the individual limited-bandwidth segment is indicated by bin number 0. For bin numbers less than 16, the value of the bin number is the same as the bin number. For bin numbers 16 through 31 the value of bin number is the bin number minus 32. The value of the bin number is used to define the fine frequency control word 81.

Coincidental detection (C=1) occurs when over one dwell period $N_{DWELL}$, during which the test statistic T is positive (T>0), the value of $MAX_K$ BIN# is not more than R bin positions different from the value of $MAX_{K-1}$ BIN# for the previous maximum individual limited-bandwidth segment; whereupon a count CNT is incremented by one, as shown at 86. When the count CNT during one dwell period $N_{DWELL}$ is equal to or greater than the required number of coincidence detections $N_{DET}$, the carrier frequency is detected, as shown at 88, and the fine frequency control word 81 is provided, as shown at 89 for addition to the coarse frequency control word 80 to thereby compose the frequency control word FWC that is representative of the carrier frequency.

The fine frequency control word 81 is equal to the value of $MAX_K$ BIN# for the spectral position at which the carrier frequency is detected times the spacing $\Delta_{BIN}$ between the spectral positions. $\Delta_{BIN}$ is determined in accordance with Equation 18.

When the count CNT during one dwell period $N_{DWELL}$ is less than the required number of coincidence detections $N_{DET}$, detection processor 20 steps to the next step in the spiral search, as shown at 90.

The carrier frequency detection system of the present invention includes computer readable storage media containing instructions for accomplishing the various signal processing steps described herein. As used in the claims, the term computer readable storage medium is not limited to one computer readable medium, but may also be interpreted to mean a plurality of computer readable storage media.

The benefits specifically stated herein do not necessarily apply to every conceivable embodiment of the present invention. Further, such stated benefits of the present invention are only examples and should not be construed as the only benefits of the present invention.

While the above description contains many specificities, these specificities are not to be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

Regarding the method claims, except for those steps that can only occur in the sequence in which they are recited, and except for those steps for which the occurrence of a given sequence is specifically recited or must be inferred, the steps of the method claims do not have to occur in the sequence in which they are recited.

The invention claimed is:

1. A method of detecting a carrier frequency in a received modulated signal, comprising the steps of:
   (a) filtering the received signal to pass the received signal in a band of frequencies including a carrier frequency at which the signal was received;
   (b) processing the filtered received signal to remove modulation components and thereby generate a test signal at the carrier frequency;
   (c) processing the test signal to provide an amplitude spectrum of samples at different test frequencies; and
   (d) processing the amplitude spectrum to detect the carrier frequency in accordance with the test frequency at which there is a test statistic of the highest magnitude;
   wherein step (d) comprises the steps of:
   (e) determining the magnitude of the test statistic by processing a signal statistic in relation to a noise statistic, wherein the signal statistic is the amplitude of the largest-amplitude sample; and
   (f) determining the noise statistic by averaging the amplitudes of samples outside of an exclusion region that includes the largest-amplitude sample, a number of samples immediately above the spectral position of largest-amplitude sample and a number of samples immediately below the spectral position of the largest-amplitude sample.

2. A method according to claim 1, wherein step (e) comprises the step of:
   (g) determining the magnitude of the test statistic for an individual segment of the amplitude spectrum by subtracting from the signal statistic a multiple of the noise statistic and a detection parameter.

3. A method according to claim 2, wherein the detection parameter is a predetermined quantity divided by the number of samples that are averaged to determine the noise statistic.

4. A method according to claim 1, wherein step (d) comprises the steps of:
   (g) segmenting the test signal into segments of limited bandwidth that are centered about different frequencies;
   (h) processing a predetermined one of the limited-bandwidth segments that is centered about an assumed carrier frequency to determine whether the carrier frequency is within said one individual segment; and
   (i) when it is determined that the carrier frequency is not in the predetermined one limited-bandwidth segment, processing at least one of the other said limited-bandwidth segments until it is determined that the carrier frequency is within the limited-bandwidth segment currently being processed.

5. A method according to claim 4, wherein the frequency bands of the limited-bandwidth segments overlap.

6. A method according to claim 4, in combination with the step of:
   (j) when the carrier frequency is detected, providing a frequency control word for use in acquiring the received signal at the detected carrier frequency;
   wherein step (j) comprises the steps of:
   (k) temporarily providing a coarse frequency control word that is representative of the center frequency of the individual limited-bandwidth segment currently being processed; and
   (l) composing the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

7. A method according to claim 1, wherein step (d) comprises the steps of:
   (g) segmenting the test signal into individual segments of limited-bandwidth that are centered about different frequencies; and
   (h) processing the individual limited-bandwidth segments of the test signal in accordance with a Fast Fourier Transform to provide separate said amplitude spectra for respective said limited-bandwidth segments.

8. A method according to claim 7, wherein during step (d), steps (e) and (f) are performed for the individual limited-bandwidth segments.

9. A method of detecting a carrier frequency in a received modulated signal, comprising the steps of:
   (a) filtering the received signal to pass the received signal in a band of frequencies including a carrier frequency at which the signal was received;
   (b) processing the filtered received signal to remove modulation components and thereby generate a test signal at the carrier frequency;
   (c) processing the test signal to provide an amplitude spectrum of samples at different test frequencies; and (d) processing the amplitude spectrum to detect the carrier frequency in accordance with the test frequency at which there is a test statistic of the highest magnitude;

wherein step (d) comprises the steps of:

(e) segmenting the test signal into segments of limited bandwidth that are centered about different frequencies;

(f) processing a predetermined one of the limited-bandwidth segments that is centered about an assumed carrier frequency to determine whether the carrier frequency is within said one individual segment; and (g) when it is determined that the carrier frequency is not in the predetermined one limited-bandwidth segment, processing at least one of the other said limited-bandwidth segments until it is determined that the carrier frequency is within the limited-bandwidth segment currently being processed;

in combination with the step of:

(h) when the carrier frequency is detected, providing a frequency control word for use in acquiring the received signal at the detected carrier frequency;

wherein step (h) comprises the steps of:

(i) temporarily providing a coarse frequency control word that is representative of the center frequency of the individual limited-bandwidth segment currently being processed; and (j) composing the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

10. A method according to claim 9, wherein the frequency bands of the limited-bandwidth segments overlap.

11. A method according to claim 9, wherein step (d) further comprises the step of:

(k) processing the individual limited-bandwidth segments of the test signal in accordance with a Fast Fourier Transform to provide separate said amplitude spectra for respective said limited-bandwidth segments.

12. A system for detecting a carrier frequency in a received modulated signal, comprising the steps of:

means for filtering the received signal to pass the received signal in a band of frequencies including a carrier frequency at which the signal was received;

means for processing the filtered received signal to remove modulation components and thereby generate a test signal at the carrier frequency;

means for processing the test signal to provide an amplitude spectrum of samples at different test frequencies; and means for processing the amplitude spectrum to detect the carrier frequency in accordance with the test frequency at which there is a test statistic of the highest magnitude;

wherein the means for processing the amplitude spectrum include:

means for determining the magnitude of the test statistic by processing a signal statistic in relation to a noise statistic, wherein the signal statistic is the amplitude of the largest-amplitude sample; and means for determining the noise statistic by averaging the amplitudes of samples outside of an exclusion region that includes the largest-amplitude sample, a number of samples immediately above the spectral position of largest-amplitude sample and a number of samples immediately below the spectral position of the largest-amplitude sample.

13. A system according to claim 12, wherein the means for determining the magnitude of the test statistic include:

means for determining the magnitude of the test statistic for an individual segment of the amplitude spectrum by subtracting from the signal statistic a multiple of the noise statistic and a detection parameter.

14. A system according to claim 13, wherein the detection parameter is a predetermined quantity divided by the number of samples that are averaged to determine the noise statistic.

15. A system according to claim 12, wherein the means for processing the amplitude spectrum include:

means for segmenting the test signal into segments of limited bandwidth that are centered about different frequencies;

means for processing a predetermined one of the limited-bandwidth segments that is centered about an assumed carrier frequency to determine whether the carrier frequency is within said one individual segment; and means for processing at least one of the other said limited-bandwidth segments until it is determined that the carrier frequency is within the limited-bandwidth segment currently being processed, when it is determined that the carrier frequency is not in the predetermined one limited-bandwidth segment.

16. A system according to claim 15, wherein the frequency bands of the limited-bandwidth segments overlap.

17. A system according to claim 15, in combination with:

means for providing a frequency control word for use in acquiring the received signal at the detected carrier frequency when the carrier frequency is detected;

wherein the means for providing a frequency control word include:

means for temporarily providing a coarse frequency control word that is representative of the center frequency of the individual limited-bandwidth segment currently being processed; and means for composing the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

18. A system according to claim 12, wherein the means for processing the amplitude spectrum include:

means for segmenting the test signal into individual segments of limited-bandwidth that are centered about different frequencies; and means for processing the individual limited-bandwidth segments of the test signal in accordance with a Fast Fourier Transform to provide separate said amplitude spectra for respective said limited-bandwidth segments.

19. A system according to claim 18, wherein the magnitude of the test statistic and the noise statistic are determined for the individual limited-bandwidth segments.

20. A system for detecting a carrier frequency in a received modulated signal, comprising the steps of:

means for filtering the received signal to pass the received signal in a band of frequencies including a carrier frequency at which the signal was received;

means for processing the filtered received signal to remove modulation components and thereby generate a test signal at the carrier frequency;

means for processing the test signal to provide an amplitude spectrum of samples at different test frequencies; and means for processing the amplitude spectrum to detect the carrier frequency in accordance with the test frequency at which there is a test statistic of the highest magnitude;

wherein the means for processing the amplitude spectrum include:

means for segmenting the test signal into segments of limited bandwidth that are centered about different frequencies;

means for processing a predetermined one of the limited-bandwidth segments that is centered about an assumed carrier frequency to determine whether the carrier frequency is within said one individual segment; and means for processing at least one of the other said limited-bandwidth segments until it is determined that the carrier frequency is within the limited-bandwidth segment being processed, when it is determined that the carrier frequency is not in the predetermined one limited-bandwidth segment;

in combination with means for providing a frequency control word for use in acquiring the received signal at the detected carrier frequency when the carrier frequency is detected;

wherein the means for providing the frequency control word include:

means for temporarily providing a coarse frequency control word that is representative of the center frequency of the individual limited-bandwidth segment currently being processed; and means for composing the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

21. A system according to claim 20, wherein the frequency bands of the limited-bandwidth segments overlap.

22. A system according to claim 20, wherein the means for processing the amplitude spectrum further include:

means for processing the individual limited-bandwidth segments of the test signal in accordance with a Fast Fourier Transform to provide separate said amplitude spectra for respective said limited-bandwidth segments.

23. A computer readable medium for use with a computer in a system for detecting a carrier frequency in a received modulated signal, said system comprising: means for filtering the received signal to pass the received signal in a band of frequencies including a carrier frequency at which the signal was received; means for processing the filtered received signal to remove modulation components and thereby generate a test signal at the carrier frequency; processing the test signal to provide an amplitude spectrum of samples at different test frequencies; and means for processing the amplitude spectrum to detect the carrier frequency in accordance with the test frequency at which there is a test statistic of the highest magnitude;

wherein the computer readable medium contains program instructions for:

(a) causing the computer to determine the magnitude of the test statistic by processing a signal statistic in relation to a noise statistic, wherein the signal statistic is the amplitude of the largest-amplitude sample; and (b) causing the computer to determine the noise statistic by averaging the amplitudes of samples outside of an exclusion region that includes the largest-amplitude sample, a number of samples immediately above the spectral position of largest-amplitude sample and a number of samples immediately below the spectral position of the largest-amplitude sample.

24. A computer readable medium for use with a computer in a system for detecting a carrier frequency in a received modulated signal, said system comprising: means for filtering the received signal to pass the received signal in a band of frequencies including a carrier frequency at which the signal was received; means for processing the filtered received signal to remove modulation components and thereby generate a test signal at the carrier frequency; processing the test signal to provide an amplitude spectrum of samples at different test frequencies; means for processing the amplitude spectrum to detect the carrier frequency in accordance with the test frequency at which there is a test statistic of the highest magnitude; and means for segmenting the test signal into segments of limited bandwidth that are centered about different frequencies;

wherein the computer readable medium contains program instructions for:

(a) causing the computer to process a predetermined one of the limited-bandwidth segments that is centered about an assumed carrier frequency to determine whether the carrier frequency is within said one individual segment; and (b) when it is determined that the carrier frequency is not in the predetermined one limited-bandwidth segment, causing the computer to process at least one of the other said limited-bandwidth segments until it is determined that the carrier frequency is within the limited-bandwidth segment currently being processed;

(c) when the carrier frequency is detected, causing the computer to provide a frequency control word for use in acquiring the received signal at the detected carrier frequency;

(d) causing the computer to temporarily provide a coarse frequency control word that is representative of the center frequency of the individual limited-bandwidth segment currently being processed; and (e) causing the computer to compose the frequency control word by combining the currently provided coarse frequency control word with a fine frequency control word that is representative of a frequency-offset from the center frequency of the currently processed individual bandwidth segment to the test frequency at which the test statistic of the highest magnitude is detected.

* * * * *

UNITED STATES PATENT AND TRADEMARK OFFICE
CERTIFICATE OF CORRECTION

PATENT NO. : 7,336,732 B1  Page 1 of 1
APPLICATION NO. : 10/900704
DATED : February 26, 2008
INVENTOR(S) : Wiss It is certified that error appears in the above-identified patent and that said Letters Patent is hereby corrected as shown below:

At columns 6, 7 and 8, Table 1 should read as follows:

| (i), LU,RS | (i), LU,RS | (i), LU,RS | (i), LU,RS | (i), LU,RS | (i), LU,RS | (i), LU,RS | (i), LU,RS |
|---|---|---|---|---|---|---|---|
| (0), 127,1 | (16), 124,6 | (32), 126,7 | (48), 84,7 | (64), 127,8 | (80), 102,8 | (96), 85,8 | (112), 73,8 |
| (1), 127,2 | (17), 117,6 | (33), 122,7 | (49), 83,7 | (65), 125,8 | (81), 101,8 | (97), 84,8 | (113), 72,8 |
| (2), 102,3 | (18), 111,6 | (34), 119,7 | (50), 81,7 | (66), 123,8 | (82), 99,8 | (98), 83,8 | (114), 72,8 |
| (3), 73,3 | (19), 105,6 | (35), 115,7 | (51), 80,7 | (67), 121,8 | (83), 98,8 | (99), 82,8 | (115), 71,8 |
| (4), 114,4 | (20), 100,6 | (36), 112,7 | (52), 78,7 | (68), 120,8 | (84), 97,8 | (100), 82,8 | (116), 70,8 |
| (5), 93,4 | (21), 95,6 | (37), 109,7 | (53), 77,7 | (69), 118,8 | (85), 96,8 | (101), 81,8 | (117), 70,8 |
| (6), 79,4 | (22), 91,6 | (38), 106,7 | (54), 75,7 | (70), 116,8 | (86), 95,8 | (102), 80,8 | (118), 69,8 |
| (7), 68,4 | (23), 87,6 | (39), 104,7 | (55), 74,7 | (71), 115,8 | (87), 94,8 | (103), 79,8 | (119), 69,8 |
| (8), 120,5 | (24), 84,6 | (40), 101,7 | (56), 72,7 | (72), 113,8 | (88), 93,8 | (104), 78,8 | (120), 68,8 |
| (9), 108,5 | (25), 80,6 | (41), 99,7 | (57), 71,7 | (73), 111,8 | (89), 92,8 | (105), 78,8 | (121), 67,8 |
| (10), 98,5 | (26), 77,6 | (42), 96,7 | (58), 70,7 | (74), 110,8 | (90), 91,8 | (106), 77,8 | (122), 67,8 |
| (11), 89,5 | (27), 74,6 | (43), 94,7 | (59), 69,7 | (75), 109,8 | (91), 90,8 | (107), 76,8 | (123), 66,8 |
| (12), 82,5 | (28), 72,6 | (44), 92,7 | (60), 68,7 | (76), 107,8 | (92), 89,8 | (108), 76,8 | (124), 66,8 |
| (13), 76,5 | (29), 69,6 | (45), 90,7 | (61), 67,7 | (77), 106,8 | (93), 88,8 | (109), 75,8 | (125), 65,8 |
| (14), 71,5 | (30), 67,6 | (46), 88,7 | (62), 66,7 | (78), 104,8 | (94), 87,8 | (110), 74,8 | (126), 65,8 |
| (15), 66,5 | (31), 65,6 | (47), 86,7 | (63), 65,7 | (79), 103,8 | (95), 86,8 | (111), 73,8 | (127), 64,8 |

Signed and Sealed this

Eighth Day of July, 2008

JON W. DUDAS
*Director of the United States Patent and Trademark Office*